April 17, 1962  V. M. GIANNOCCORA  3,030,044

FILM SPOOL INVERTER

Filed Feb. 8, 1960

INVENTOR.
Victor M. Giannoccora
BY Samuel Mearbrecks

ATTORNEY

United States Patent Office 3,030,044
Patented Apr. 17, 1962

3,030,044
FILM SPOOL INVERTER
Victor M. Giannoccora, 2067 38th St.,
Long Island City, N.Y.
Filed Feb. 8, 1960, Ser. No. 7,201
3 Claims. (Cl. 242—71.2)

This invention relates to an improved film spool holder and inverter and is intended to be used with cameras such as an 8 mm. camera where one-half of the entire longitudinal width of a spool of film is first exposed, and invertable spools are reversed whereafter the remaining longitudinal width is exposed.

A primary object of the invention is to provide means facilitating the reversal of film spools in a ready and expeditious manner, in a minimum amount of time and with a minimum waste of film.

A further object of the invention is to provide a novel film spool holder including circular portions in which invertible spools are removably received, and which are sealingly engaged at the peripheral edge of the spools, and which facilitate the reversal of the spools without the intimate handling of the spools.

More particular objects of the invention will become apparent from the reading of the following description of the preferred embodiment, the appended claims and accompanying drawing, in which:

Figure 1:
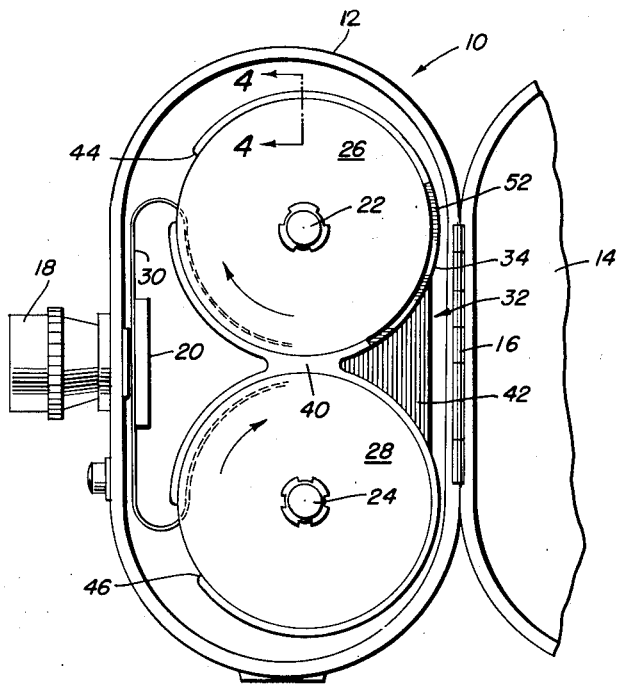
FIGURE 1 is a side elevation of an open camera showing the novel spool inverter installed.
Figure 4:
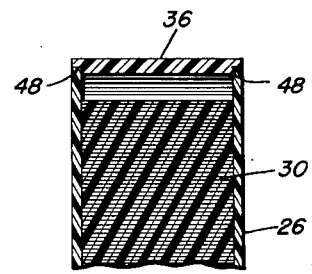
FIGURE 4 is an enlarged fragmentary section taken on line 4—4 of FIGURE 1.
Figure 2:
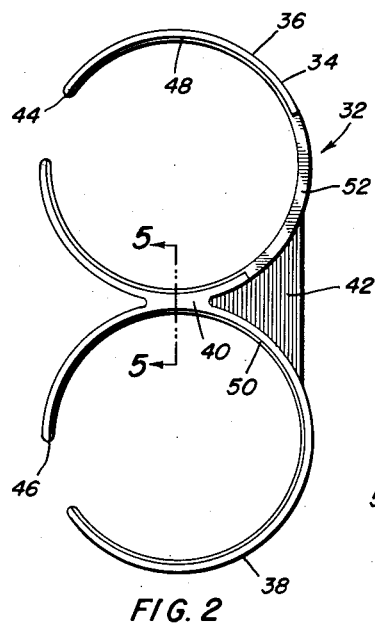
FIGURE 2 is a side elevation of the novel spool inverter with the spools removed.
Figure 3:
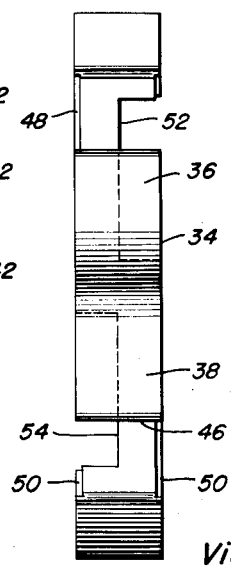
FIGURE 3 is a front elevation of the spool inverter looking from left to right at FIGURE 2.
Figure 5:
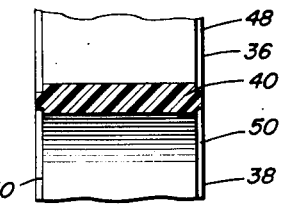
FIGURE 5 is an enlarged fragmentary section taken on line 5—5 of FIGURE 2.

Referring to FIGURE 1, a typical 8 mm. camera is indicated at 10, the camera including an oblong case 12 having semi-circular ends and a cooperating cover 14 hinged at 16 to the case. The camera includes the usual laterally extended lense assembly 18 and film gate 20 cooperating therewith.

The case has mounted therein equidistantly from the semi-circular ends thereof a three sided spindle 22 and a four sided spindle 24. The spindles are spring driven, the details being conventional and not shown. Mounted on the spindle 22 is a supply spool 26 and mounted on the spindle 24 is a second spool 28.

The spindle 24 is driven clockwise and the film 30 drawn off the spool 26 causes this spool to rotate clockwise due to the manner in which the film is initially wound.

In the camera briefly described, the spools will accommodate a roll of film which is 16 mm. wide, and the spools will have one side plate which will fit on spindle 22 and another side plate which will fit on spindle 24. After one-half width and one entire longitudinal extent is exposed, all the film will be drawn from spool 26 and wound on spool 28. The relative positions of the spools are changed, i.e., they are turned end-for-end and the remaining longitudinal portions of the film are exposed. The film is split during development as is conventional.

The film spool inverter or holder is indicated generally at 32 and comprises a one piece skeletonized frame 34 including two resilient, circular portions 36, 38. The circular portions 36, 38 are tangentially connected by a web portion 40 and reinforced by a triangular shaped web portion 42.

The circular portions 36, 38 include transverse slot portions 44, 46, respectively, through which the film strip 30 will extend and each peripheral edge 48 and 50 of the circular portions 36, 38 is undercut to form a shouldered portion receiving the respective edge portion of a film spool therein. The spools will rotate relative to the holder and the holder will be constructed from any suitable material, such as a readily moldable plastic which will keep the cost thereof at a minimum.

The circular portions 36, 38 may respectively include arcuate cut-out portions 52, 54, respectively, extending one-half the width of the holder and accommodating the end portion of a gage finger which will aprize the camera user of the amount of film remaining to be exposed. The specific gage structure of the camera is conventional and is not shown.

*Operation*

The film holder 32 is loaded with a full roll of unexposed film or spool 26 and the terminal end of the film 30 is engaged in gate 20 of the camera and the film is exposed in the conventional manner; i.e., the entire length of the film strip and one-half the width is exposed, and the film will then be rolled on spool 28.

The gate is operated to release the film 30, and the holder 32 is inverted whereby the spool 28 is on spindle 22 and spool 26 is on spindle 24. The gate 20 is once more engaged with the film, and thereafter the remaining portion of the film strip is exposed.

The spools are handled simultaneously by the use of the novel described holder and are oriented into their proper position by the holder. The film is only handled where it is threaded through the gate 20.

The construction shown embodies the invention in a preferred form, however, it is intended that the disclosure be illustrative rather than definitive, the scope of the invention being defined in the appended claims.

What is claimed is:

1. A film spool inverter, said inverter comprising a one-piece skeletonized frame including two circumferentially-deformable circular strap portions tangentially secured in abutting relationship to permit the removal and insertion of film spools therein, said strap portions each including inwardly extending axial undercut peripheral lips at each opposed margin and beneath the outer surface of said strap portions and providing a bearing and light sealing surface for rotatably engaging the peripheral edges of the spools journaled in said inverter frame, each of said strap portions including a transverse slot for opening toward a camera film gate to facilitate the threading of the film carried by said inverter.

2. The structure of claim 1, including in combination a pair of invertable spools removably mounted and journaled on the undercut peripheral lips of said circular portions.

3. The structure of claim 1, said frame including aperture means opposite said slots for permitting the use of a film gage to determine the amount of film left to be exposed.

References Cited in the file of this patent
UNITED STATES PATENTS

| | | |
|---|---|---|
| 897,822 | Dougherty | Sept. 1, 1908 |
| 959,675 | Woodworth | May 31, 1910 |
| 1,210,546 | Schulz | Jan. 2, 1917 |
| 1,300,257 | Felland | Apr. 15, 1919 |
| 1,686,650 | Chanier | Oct. 9, 1928 |
| 1,864,877 | White | June 28, 1932 |
| 2,106,374 | Goldhammer et al. | Jan. 25, 1938 |
| 2,163,179 | Porter | June 20, 1939 |
| 2,319,530 | Bolsey | May 18, 1943 |
| 2,854,199 | Boyer | Sept. 30, 1958 |